United States Patent [19]

Walter

[11] Patent Number: 4,678,848

[45] Date of Patent: Jul. 7, 1987

[54] PROCESS FOR PREPARING SULFUR-MODIFIED CHLOROPRENE POLYMERS

[75] Inventor: Henry C. Walter, Wilmington, Del.

[73] Assignee: E. I. Du Pont De Nemours and Company, Wilmington, Del.

[21] Appl. No.: 249,907

[22] Filed: Apr. 1, 1981

Related U.S. Application Data

[63] Continuation of Ser. No. 117,504, Feb. 1, 1980, abandoned.

[51] Int. Cl.$^4$ ................................................ C08F 8/34
[52] U.S. Cl. .................................................... 526/220
[58] Field of Search .................. 526/220, 213, 225

Primary Examiner—Paul R. Michl

[57] ABSTRACT

Sulfur-modified chloroprene polymers and copolymers can be prepared by a free-radical polymerization process in an alkaline, aqueous emulsion, wherein a thiuram disulfide having aliphatic, acyclic or cyclic substituents on both nitrogen atoms, the total number of carbon atoms of those substituents being 12–24, also is present. This process avoids the time-consuming separate peptization step and reduces the capital requirements by eliminating peptization tanks and their associated equipment.

17 Claims, No Drawings

PROCESS FOR PREPARING SULFUR-MODIFIED CHLOROPRENE POLYMERS

This is a continuation of application Ser. No. 117,504, filed Feb. 1, 1980, now abandoned.

BACKGROUND OF THE INVENTION

This invention is directed to a process for the preparation of sulfur-modified chloroprene polymers which does not require a separate peptization step.

Sulfur-modified chloroprene polymers are well known and are available commercially under the trade designation Neoprene G types. They are made by polymerization of chloroprene or copolymerization of chloroprene with another unsaturated organic monomer in the presence of elemental sulfur. The polymer, as made, contains sulfur atoms in its chain, and at high conversion it is appreciably crosslinked. Because of its normally high molecular weight, this polymer cannot be processed directly but must first be broken down to a lower molecular weight. This step, known as peptization, is normally accomplished by treating polymer latex with a tetraalkylthiuram disulfide in combination with a sodium dialkyl dithiocarbamate or other sulfur-containing nucleophile. Preparation and peptization of sulfur-modified chloroprene polymers is described, for example, in the following U.S. Pat. Nos. 2,234,215 (Youker); 3,595,847 (Mayer-Mader); and 3,920,623 (Kahn).

The peptization step, while necessary in the commercial processes for preparing Neoprene G types, is regarded by the industry as a nuisance since it is time-consuming (frequently requiring several hours) and ties up valuable plant space for holding tanks and associated equipment. Because of this equipment, the peptization step also requires additional capital investment.

Peptization of sulfur-modified chloroprene polymers can be readily accomplished by use of tetraalkylthiuram disulfides in the presence of sulfur-containing nucleophiles. These compounds have not been heretofore used in the polymerization step itself because they often inhibit polmerization. While the possibility of carrying out the polymerization in the presence of a tetraalkylthiuram disulfide was suggested in U.S. Pat. No. 1,950,439 to Carothers et al. as early as 1934, the disadvantages of running the polymerization in the presence of tetraalkylthiuram disulfides were always considered to outweigh any possible advantages. Yet, because tetraalkylthiuram disulfides are readily available and well accepted by the industry, it would be desirable to be able to conduct the chloroprene/sulfur copolymerization in their presence under such conditions that a highly crosslinked polymer would not be formed and a separate peptization step prior to isolation would not be necessary.

SUMMARY OF THE INVENTION

It has now been discovered that a sulfur-modified polymer of chloroprene or copolymer of chloroprene with another unsaturated organic monomer, which may be present in an amount of up to 20 weight percent to total organic monomers, can be readily prepared by a free-radical initiated polymerization in an alkaline aqueous emulsion in the presence of about 0.1–0.8 part of sulfur per 100 parts by weight of total organic monomers (phr) and of a thiuram disulfide having the following formula (1)

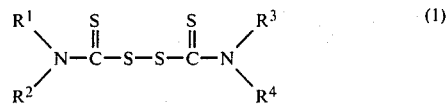

wherein each of $R^1$, $R^2$, $R^3$, and $R^4$ independently is an alkyl or cycloalkyl; but $R^1$ and $R^2$ together or $R^3$ and $R^4$ together may independently be joined to form divalent, aliphatic radicals; the sum of all the carbon atoms of $R^1$, $R^2$, $R^3$, and $R^4$ taken together being 12 to 24; and the amount of said thiuram disulfide of formula (1) being equivalent to about 0.3–2 phr of tetrabutylthiuram disulfide.

DETAILED DESCRIPTION OF THE INVENTION

Suitable organic monomers which can be copolymerized with chloroprene and sulfur according to the process of this invention include, for example, styrene, vinyltoluenes, vinylnaphthalenes, 1,3-butadiene, isoprene, 2,3-dimethyl-1,3-butadiene, 2,3-dichloro 1,3-butadiene, methyl vinyl ether, vinyl acetate, methyl vinyl ketone, ethyl acrylate, methyl methacrylate, methacrylamide, and acrylonitrile. The preferred proportion of sulfur is 0.25–0.6 phr.

Suitable tetraalkylthiuram disulfides may be either symmetrical or unsymmetrical, and their acyclic alkyl groups may be linear or branched. Representative alkyl groups are methyl, ethyl, propyl, isopropyl, butyl, t-butyl, isobutyl, pentyl, isoamyl, t-pentyl, hexyl, 36-hexyl, heptyl and its various isomers, and octyl and its various isomers. Cycloalkyl groups include cyclopentyl, cyclohexyl, and cycloheptyl. When two alkyl groups on the same nitrogen atom are joined together, the resulting divalent radical may be, for example, tetra, penta, or hexamethylene groups, and the resulting structure will be a heterocyclic ring. When, for example, $R^1$ and $R^2$ taken together form the pentamethylene radical, the resulting heterocyclic ring forms the N-piperidyl radical. It is critical to the successful operation of the process of this invention that the thiuram disulfides contain no fewer than 14 and no more than 26 carbon atoms, including those attached to the sulfur atoms. When fewer than 12 carbon atoms, are contributed by the $R^1$, $R^2$, $R^3$, and $R^4$ groups, the polymerization is so inhibited that the polmerization rate is impractically low. When more than 24 carbon atoms are contributed by those groups, the polymer molecular weight control is not sufficiently effective, and the resulting polymer still must be peptized to a lower molecular weight material. The most commonplace and the most practical will be tetraalkylthiuram disulfides, i.e., those compounds of formula (1) in which $R^1$, $R^2$, $R^3$, and $R^4$ are alkyl groups, and particularly those where they are, independently of one another, $C_3$–$C_6$ alkyl groups. Especially preferred are the symmetrical tetraalkylthiuram disulfides in which each of $R^1$, $R^2$, $R^3$, and $R^4$ is the same $C_3$–$C_6$ alkyl group. It may be mentioned in this connection that tetraalkylthiuram disulfides are not generally effective chain transfer agents like, for example, alkyl mercaptans. Their weight control capability in the process of the present invention may lie in their ability to cleave sulfur-sulfur bonds during the polymerization.

Although all the thurtram disulfides contemplated by the present invention will effectively control the polymer molecular weight, not all of them will be equally effective on weight basis. Tetrabutylthiuram disulfide and tetraisobutylthiuram disulfide have been found to be the most effective and are by far the preferred thiuram disulfides in the present process. Equivalent amounts of other thiuram disulfides can be found from experimental curves which can be readily obtained by one skilled in the art from simple experiments correlating the degree of peptization with the concentrations of thiuram disulfides. The preferred concentrations of the other thiuram disulfides can be determined from their experimental equivalency curves.

The general polymerization techniques are well known. One can use, for example, the free-radical polymerization process described in U.S. Pat. No. 3,397,173 to Collette et al. Polymerization may be, for example, carried out as follows: An aqueous solution of the polymerization initiator is added to an aqueous emulsion containing the organic monomer or monomers, sulfur, and the tetraalkylthiuram disulfide. Emulsifiers are, of course, necessary. The pH of the polymerization medium is maintained at about 11°–13. The temperature range is quite broad, 0°–80° C. being suitable, although a temperature of 40°–50° C. is preferred. Polymerization is carried out to the desired conversion, normally from about 70% to about 90%. For economic reasons, it is preferred to operate at reasonably high conversions, for example, 75%. Below 70%, it is both cumbersome and expensive to recover unchanged monomer and to isolate the polymer from a low-solids latex. Conversions above 90% increase the polymer viscosity to the point where undesirable gelation occurs. When the desired coversion is reached, polymerization is short-stopped by the addition of a convenient short-stopping agent, such as, for example, a mixture of p-t-butyl catechol and phenothiazine. Unchanged monomer is steam-stripped from the polymer latex, for example, as described in U.S. Pat. No. 2,467,769 to Morrow et al. The stripped latex is acidified, and the polymer is conveniently isolated on a freeze-roll, according to the process of U.S. Pat. No. 2,187,146 to Calcott et al.

Suitable polymerization initiators include hydrogen peroxide, cumene hydroperoxide, water-soluble salts of peroxydisulfuric acid, 2,2'-azobisisobutyronitrile and salts of formamidinesulfinic acid. A combination of potassium persulfate and sodium anthraquinone-$\beta$-sulfonate is a particularly preferred initiator. The initiator is used in an amount of about 0.1 to 0.3 phr, depending on the desired polymerization rate.

Usual polmerization emulsifiers may be employed, such as the water-soluble alkali metal salts of long-chain fatty acids, rosin acids and disproportionated rosin acids. In addition to these primary emulsifiers, it is frequently desirable to use secondary emulsifiers such as, for example, arylsulfonic acids and their condensation products with formaldehyde; alkyl- and arylsulfonates, and sulfonated oxyethylated alcohols and phenols. Especially preferred secondary emulsifiers are the sodium salts of the condenation products of formaldehyde with a naphthalene-sulfonic acid ("Lormar" PW sold by Diamond Shamrock Corporation). Nancy Wood Rosin (sold by Reichhold Chemicals, Inc.) is a particularly preferred primary emulsifier and consists of a mixture of rosin acids high in conjugated dienes.

The sulfur-modified chloroprene polymers and copolymers prepared according to the process of the present invention have practical molecular weights, as expressed by their viscosities. It is not necessary to subject them to a separate peptization step. Since, however, polymer viscosity may change on standing or in storage (for example, as a result of some cleavage or reformation of sulfur-sulfur bonds), it is desirable to stabilize these polymers against such viscosity changes by adding to the polymer a small amount of a tetraalkylthiuram disulfide. This second portion of a tetraalkylthiuram disulfide may be added either to the polymer latex, prior to polymer isolation, or to the isolated and dry polymer on a mill. In addition to the thiuram disulfides of formula (1), as defined above, tetraethylthiuram disulfide also can be used. This stabilizing amount normally is about 0.5 to 1.5 parts per 100 parts of latex solids or of dry polymer.

The sulfur-modified chloroprene polymers and copolymers of this invention can be cured and compounded in the same manner as other G-type chloroprene polymers. Various chloroprene polymer vulcanization techniques are described, for example, in the Encyclopedia of Polymer Science and Technology, H. F. Mark and N. G. Gaylord, Editors, Interscience Publishers, Vol. 3, 1965, pages 724–730. The vulcanizates have good physical properties.

This invention is now illustrated by the following examples, of certain preferred embodiments thereof, where all parts, proportions and percentages are by weight unless otherwise indicated.

POLYMER PREPARATION

The polymerizations were run in 5-liter flasks under nitrogen at 40° C. All runs were made using 1500 g of chloroprene according to the emulsion recipes given in Table I.

TABLE I

|  | Emulsion Recipes (parts) | | |
| --- | --- | --- | --- |
|  | A | B | C |
| Organic Phase |  |  |  |
| Chloroprene | 100 | 100 | 100 |
| Nancy Wood Rosin | 4 | 4 | 4 |
| Sulfur | 0.6 | 0.6 | (a) |
| Thiuram Disulfide | (b) | (c) | (a) |
| Aqueous Phase |  |  |  |
| Deionized Water | 113.8 | 113.8 | 96 |
| Sodium Salt of Condensate of Formaldehyde and Naphthalene-Sulfonic Acid | 0.6 | 0.6 | 0.35 |
| Sodium Lauryl Sulfate | 0.2 | — | — |
| Sodium Hydroxide | 0.71 | 0.71 | 0.63 |
| Sodium Chloride | — | — | 0.19 |
| Copper (+2) ion, as copper sulfate | $46 \times 10^{-6}$ | $46 \times 10^{-6}$ | $46 \times 10^{-6}$ |
| Initiator Solution |  |  |  |
| Deionized Water | 100 |  |  |
| Potassium Persulfate | 5 |  |  |
| Sodium anthraquinone-$\beta$-sulfonate | 0.125 |  |  |

(a) See Table IV
(b) See Table II
(c) See Table III

The organic and aqueous phases were emulsified in a high-speed mixer for three minutes. Polymerization was initiated and a suitable rate was maintained by adding the initiator solution in small increments. When the desired level of conversion was reached, the polymerization was stopped by adding an emulsified solution of 0.013 phr phenothiazine and 0.013 phr p-tert-butyl catechol in toluene. Unchanged monomer was steam-stripped from the latex, and the stripped latex was acidified to pH 5.5 to 5.6 with a 10% acetic acid solution containing 2% of the sodium salt of a condensate of formaldehyde and naphthalenesulfonic acid. The polymer was isolated by the freeze-roll technique and air dried at 100° C.

All polymers were evaluated by measuring the Mooney viscosity according to ASTM Method D1646 at 100° C. The viscosity after a 2.5-minute interval was recorded.

EXAMPLES 1 to 8

Sulfur-modified chloroprene polymers were prepared using Recipe A in the presence of tetrabutylthiuram disulfide. The results given in Table II indicate that low viscosity polymers can be obtained either by varying the conversion at constant tetrabutylthiuram disulfide concentration (Examples 1 to 4) or by varying the tetrabutylthiuram disulfide concentration and polymerizing to a reasonably constant conversion (Examples 5 to 8).

TABLE II*

| Example No. | Tetrabutyl-thiuram di-sulfide (parts) | Conversion (%) | Polymerization Time (min.) | Initiator (parts) | Mooney Viscosity |
|---|---|---|---|---|---|
| 1 | 0.5 | 70.3 | 135 | 0.12 | 34 |
| 2 | 0.5 | 76.9 | 165 | 0.17 | 50 |
| 3 | 0.5 | 82.9 | 180 | 0.18 | 74 |
| 4 | 0.5 | 85.8 | 195 | 0.20 | 77.5 |
| 5 | 0.4 | 83.0 | 180 | 0.18 | 107 |
| 6 | 0.5 | 84.3 | 225 | 0.22 | 90 |
| 7 | 0.6 | 83.6 | 200 | 0.20 | 58 |
| 8 | 0.7 | 84.6 | 225 | 0.25 | 45 |

*All parts per 100 parts by weight of monomer

EXAMPLES 9 to 13

Sulfur-modified chloroprene polymers were prepared using Recipe B and different tetraalkylthiuram disulfides, which were used at concentrations equimolar with 0.5 phr of tetrabutylthiuram disulfide (1.22 millimoles/100 g chloroprene). Polymerizations were carried out to about 75% conversion. The data given in Table III show that the tetrabutyl- (and tetraisobutyl-) thiuram disulfides gave optimum results; i.e., no retardation of polymerization and maximum molecular weight control and minimum catalyst usage. When the alkyl groups were smaller (comparative Examples A and B), the polymerization was retarded. Even though it was possible to reach the desired level of conversion in comparative Example B, significantly more initiator was required.

TABLE III*

| Example No. | Tetraalkyl-thiuram disulfide | Parts | Conversion (%) | Polymerization Time (min.) | Initiator (parts) | Mooney Viscosity |
|---|---|---|---|---|---|---|
| A | Tetramethyl | 0.29 | <15 | 270 | 0.47 | — |
| B | Tetraethyl | 0.36 | 75.6 | 340 | 0.50 | 80 |
| 9 | Tetrapropyl | 0.43 | 75.8 | 195 | 0.20 | 56.5 |
| 10 | Tetrabutyl | 0.50 | 76.5 | 150 | 0.14 | 35 |
| 11 | Tetraisobutyl | 0.50 | 75.7 | 165 | 0.17 | 34 |
| 12 | Tetrapentyl | 0.57 | 76.1 | 170 | 0.17 | 71.5 |
| 13 | Tetrahexyl | 0.64 | 76.3 | 165 | 0.17 | 102 |

*All parts per 100 parts by weight of monomer

EXAMPLES 14 to 22

Sulfur-modified chloroprene polymers were prepared using Recipe C by polymerizing in presence of 1.5 phr of tetrabutylthiuram disulfide. Although this is a rather high concentration of the weight control agent, good low viscosity, low-sulfur polymers were prepared, as shown below.

TABLE IV*

| Example No. | Sulfur (parts) | Conversion (%) | Polymerization Time (min.) | Initiator (parts) | Mooney Viscosity |
|---|---|---|---|---|---|
| 14 | 0.32 | 72.5 | 135 | 0.13 | 27 |
| 15 | 0.30 | 74.8 | 145 | 0.13 | 31.5 |
| 16 | 0.275 | 74.3 | 150 | 0.14 | 36 |
| 17 | 0.25 | 72.9 | 150 | 0.14 | 40.5 |
| 18 | 0.225 | 75.3 | 135 | 0.12 | 65 |
| 19 | 0.20 | 75.8 | 150 | 0.13 | 80.5 |
| 20 | 0.175 | 77.1 | 150 | 0.13 | 93 |
| 21 | 0.25 | 80.8 | 165 | 0.17 | 55.5 |
| 22 | 0.25 | 87.3 | 195 | 0.20 | 53.5 |

*All parts per 100 parts by weight of monomer

I claim:

1. A method of preparing sulfur-modified polychloroprene by copolymerization chloroprene with sulfur, in alkaline aqueous emulsion and in the presence of a free-radical initiator, an organic polysulfide selected from the class consisting of
   (a) tetra-alkylthiuram disulfides in which the alkyl group contains from about 3 to 6 carbon atoms; and the said polysulfide is introduced before the initiation of the polymerization in proportions of between about 0.3 and 2 to 100 parts, by weight, of chloroprene charged.
2. The process of claim 1 wherein R is propyl.
3. The process of claim 1 wherein R is butyl or isobutyl.
4. The process of claim 1 wherein R is pentyl.
5. The process of claim 1 wherein R is hexyl.
6. The process of claim 1 wherein the proportion of sulfur in the polymerization emulsion is 0.25–0.6 part by weight per 100 parts by weight of the total monomers.
7. The process of claim 1 which is conducted at a temperature of about 0°–80° C. and a pH of about 11–13 to a conversion of about 70–90%.
8. The process of claim 7 wherein the temperature is maintained at about 40°–50° C.
9. The process of claim 7 wherein the conversion is at least 75%.
10. The process of claim 1 wherein there is added, either to the resulting polymer latex or to isolated, dry polymer, a viscosity-stabilizing amount of a tetraalkylthiuram disulfide.
11. A method according to claim 1, wherein the amount of sulfur is between 0.25 and 0.6% by weight of chloroprene.
12. A method according to claim 1) wherein there is also subsequently added tetraethyl thiuram disulfide in an amount of about 0.5 to 1.5 parts per 100 parts of latex solids or dry polymer.
13. A method according to claim 1, wherein the amount of sulfur is between 0.25 and 0.6% by weight referred to the chloroprene.
14. A method according to claim 12, wherein the amount of sulfur is between 0.25 and 0.6% by weight referred to the chloroprene.
15. A method according to claim 1, wherein the free-radical initiator is a member selected from the class consisting of hydrogen peroxide, cumyl peroxide, and a combination of potassium persulfate with sodium anthraquinone-$\beta$-sulfonate.
16. A method according to claim 1, wherein the pH is about 11–13.
17. A method according to claim 1, wherein the polymerization is conducted at a temperature of between about 0° and 80° C.

* * * * *